US012700797B2

(12) United States Patent　(10) Patent No.: US 12,700,797 B2
Schäfer　(45) Date of Patent: Aug. 4, 2026

(54) RANDOM SHIFTING OF SWITCHING EDGES OF A CONVERTER PULSE PATTERN

(71) Applicant: ZF Friedrichshafen AG, Friedrichshafen (DE)

(72) Inventor: Markus Schäfer, Schonungen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 938 days.

(21) Appl. No.: 17/791,821

(22) PCT Filed: Dec. 7, 2020

(86) PCT No.: PCT/EP2020/084872
§ 371 (c)(1),
(2) Date: Jul. 8, 2022

(87) PCT Pub. No.: WO2021/139938
PCT Pub. Date: Jul. 15, 2021

(65) Prior Publication Data
US 2023/0031685 A1　Feb. 2, 2023

(30) Foreign Application Priority Data

Jan. 10, 2020　(DE) ..................... 10 2020 200 244.4

(51) Int. Cl.
H02M 1/44　(2007.01)
H02M 7/539　(2006.01)
(Continued)

(52) U.S. Cl.
CPC ........... H02M 1/44 (2013.01); H02M 7/5395 (2013.01); H02P 27/08 (2013.01)

(58) Field of Classification Search
CPC .... H02M 1/44; H02M 7/5395; H02M 1/0003; H02P 27/08
See application file for complete search history.

(56) References Cited

U.S. PATENT DOCUMENTS 5,563,486 A * 10/1996 Yamamoto ................ H02P 8/32
　　　　　　　　　　　　　　　　318/696
5,680,299 A * 10/1997 Yasuda ............... H02M 7/5395
　　　　　　　　　　　　　　　　363/41
(Continued)

FOREIGN PATENT DOCUMENTS

DE　102005041621 A1　3/2006
DE　102016213276 A1　1/2018
JP　　S6369465 A　3/1988

OTHER PUBLICATIONS

Office Action for German Application No. 10 2020 200 244.4, dated Oct. 26, 2021 (10 pages).
(Continued)

*Primary Examiner* — Yusef A Ahmed
(74) *Attorney, Agent, or Firm* — Crowell & Moring LLP

(57) ABSTRACT
A method for controlling a converter includes: determining a pulse pattern for the converter, wherein the pulse pattern contains switching transitions at which an output voltage is switched between two levels; shifting switching transitions in the pulse pattern, wherein a random value is added to a point in time at which the output voltage is switched to shift the switching transitions; and applying the pulse pattern with the shifted switching transitions to switch elements in the converter to generate the output voltage.

11 Claims, 2 Drawing Sheets

(51) Int. Cl.
H02M 7/5395 (2006.01)
H02P 27/08 (2006.01)

(56) References Cited

U.S. PATENT DOCUMENTS

| | | | | |
|---|---|---|---|---|
| 6,043,996 | A * | 3/2000 | Kumar | H02M 7/5395 |
| | | | | 363/41 |
| 6,510,068 | B1 * | 1/2003 | Bors | H02M 7/5395 |
| | | | | 363/41 |
| 6,972,534 | B1 * | 12/2005 | Schulz | H02P 21/22 |
| | | | | 388/813 |
| 7,313,005 | B2 * | 12/2007 | Azuma | H03K 7/08 |
| | | | | 318/599 |
| 7,701,740 | B2 * | 4/2010 | Yamanaka | H02M 5/297 |
| | | | | 363/149 |
| 8,649,887 | B2 * | 2/2014 | Schulz | H02P 27/085 |
| | | | | 318/400.14 |
| 8,958,222 | B2 * | 2/2015 | Hart | H02M 7/53875 |
| | | | | 363/41 |
| 10,361,627 | B1 * | 7/2019 | Goller | G06F 7/584 |
| 10,541,610 | B1 * | 1/2020 | Goller | H02M 1/44 |
| 2003/0002299 | A1 * | 1/2003 | Trzynadlowski | H02M 7/5395 |
| | | | | 363/21.1 |
| 2006/0049792 | A1 * | 3/2006 | Chen | H02P 21/50 |
| | | | | 318/716 |
| 2006/0140286 | A1 * | 6/2006 | Goto | H04L 25/028 |
| | | | | 375/259 |
| 2009/0091954 | A1 * | 4/2009 | Yamanaka | H02M 5/297 |
| | | | | 363/34 |
| 2009/0326730 | A1 * | 12/2009 | Bjeljac | H03K 7/08 |
| | | | | 700/296 |
| 2010/0039157 | A1 * | 2/2010 | Kaeriyama | H03K 5/133 |
| | | | | 327/292 |
| 2011/0266992 | A1 * | 11/2011 | Nishiguchi | H02P 27/08 |
| | | | | 318/807 |
| 2012/0146565 | A1 * | 6/2012 | Parenti | H02P 27/08 |
| | | | | 318/503 |
| 2012/0243264 | A1 * | 9/2012 | Nakagawa | H02M 3/156 |
| | | | | 323/283 |
| 2012/0320650 | A1 * | 12/2012 | Weinmann | H02M 7/53875 |
| | | | | 363/132 |
| 2014/0268967 | A1 * | 9/2014 | White | H02M 7/487 |
| | | | | 363/133 |
| 2015/0048811 | A1 * | 2/2015 | Fayed | H02M 3/156 |
| | | | | 323/271 |
| 2015/0357938 | A1 * | 12/2015 | Yamasaki | H02P 27/00 |
| | | | | 363/41 |
| 2016/0211773 | A1 * | 7/2016 | Degner | H02M 1/38 |
| 2016/0276919 | A1 * | 9/2016 | Geyer | H02M 1/08 |
| 2019/0115986 | A1 * | 4/2019 | Goller | H02M 3/158 |
| 2019/0260326 | A1 * | 8/2019 | Park | H02P 6/16 |
| 2022/0231628 | A1 * | 7/2022 | Shamoto | H02P 27/08 |

OTHER PUBLICATIONS

International Search Report and Written Opinion of the International Search Authority dated Mar. 4, 2021 in International Application No. PCT/EP2020/084872 (English and German Languages) (18 pages).

Boudouda Aimad et al., "Combined Random Space Vector Modulation for a Variable Speed Drive Using Induction Motor" Electrical Engineering, Springer, Berlin, DE, vol. 98, No. 1, Jul. 19, 2015 (Jul. 19, 2015), pp. 1-15, [retrieved on Jul. 19, 2015] DOI: 10.1007/S00202-015-0341-6 ISSN: 0948-7921, XP035619648.

Drissi K E K et al. "Effects of symmetric distribution laws on spectral power density in randomized PWM" IEEE Power Electronics Letters, IEEE Service Center, New York, NY, US vol. 99, No. 2, Jun. 1, 2003 (Jun. 1, 2003), pp. 41-44 DOI: 10.1109/LPEL. 2003.820825, ISSN: 1540-7985, XP011433263.

Michael M Bech et al. "Random Modulation Techniques with Fixed Switching Frequency for Three-Phase Power Converters" IEEE Transactions on Power Electronics, Institute of Electrical and Electronics Engineers, USA, vol. 15, No. 4, Jul. 1, 2000 (Jul. 1, 2000). ISSN: 0885-8993. XP011043444.

Blaabjerg F et al. "Digital implemented random modulation strategies for AC and switched reluctance drives" Industrial Electronics, Control, and Instrumentation, 1993. Proceedings of the IECON '93., International Conference on Maui, HI USA Nov. 15-19, 1993 IEEE New York, NY USA Nov. 15, 1993 (Nov. 15, 1993), pp. 676-682 DOI: 10.1109/IECON.1993.338999 ISBN: 978-0-7803-0891-6. XP010109141.

Lee Kevin et al. "Performance Characterization of Random Pulse Width Modulation Algorithms in Industrial and Commercial Adjustable-Speed Drives" IEEE Transactions on Industry Applications, IEEE Service Center. Piscataway, NJ, US, vol. 53, No. 2, Mar. 1, 2017 (Mar. 1, 2017). pp 1078-1087. [retrieved on Mar. 17, 2017] DOI: 10.1109/TIA.2016.2616407 ISSN. 0093-9994, XP011642930.

Young-Cheol Lim et al. "A Two-Phase Separately Randomized Pulse Position PWM (SRP-PWM) Scheme With Low Switching Noise Characteristics Over the Entire Modulation Index" IEEE Transactions on Power Electronics, Institute of Electrical and Electronics Engineers, US, vol. 27, No. 1, Jan. 1, 2012 (Jan. 1, 2012) pp. 362-369 DOI: 10.1109/TPEL 2010.2087361 ISSN: 0885-8993, XP011390120.

Bu Feifei et al. "Performance and Evaluation of Five-Phase Dual Random SVPWM Strategy With Optimized Probability Density Function" IEEE Transactions on Industrial Electronics, IEEE Service Center, Piscataway, NJ USA, vol. 66, No. 5. May 1, 2019 (May 1, 2019). pp. 3323-3332. [retrieved on Dec. 31, 2018] DOI: 10.1109/TIE.2018.2854570 ISSN. 0278-0046, XP011695290.

Seung-Yeol Oh et al., "Harmonic-Spectrum Spreading Effects of Two-Phase Random Centered Distribution PWM (DZRCD) Scheme With Dual Zero Vectors" IEEE Transactions on Industrial Electronics, IEEE Service Center, Piscataway, NJ, USA, vol. 56, No. 8, Aug. 1, 2009 (Aug. 1, 2009) pp. 3013-3020 ISSN: 0278-0046, XP011257884.

Adrian V., et al. "A Randomized Wrapped-Around Pulse Position Modulation Scheme for DC-DC Converters" IEEE Transactions on Circuits and Systems I: Regular Papers, IEEE, US, vol. 57, No. 9, Sep. 1 2010 (Sep. 1 2010), pp. 2320-2333 ISSN: 1549-8328, XP011306765.

\* cited by examiner

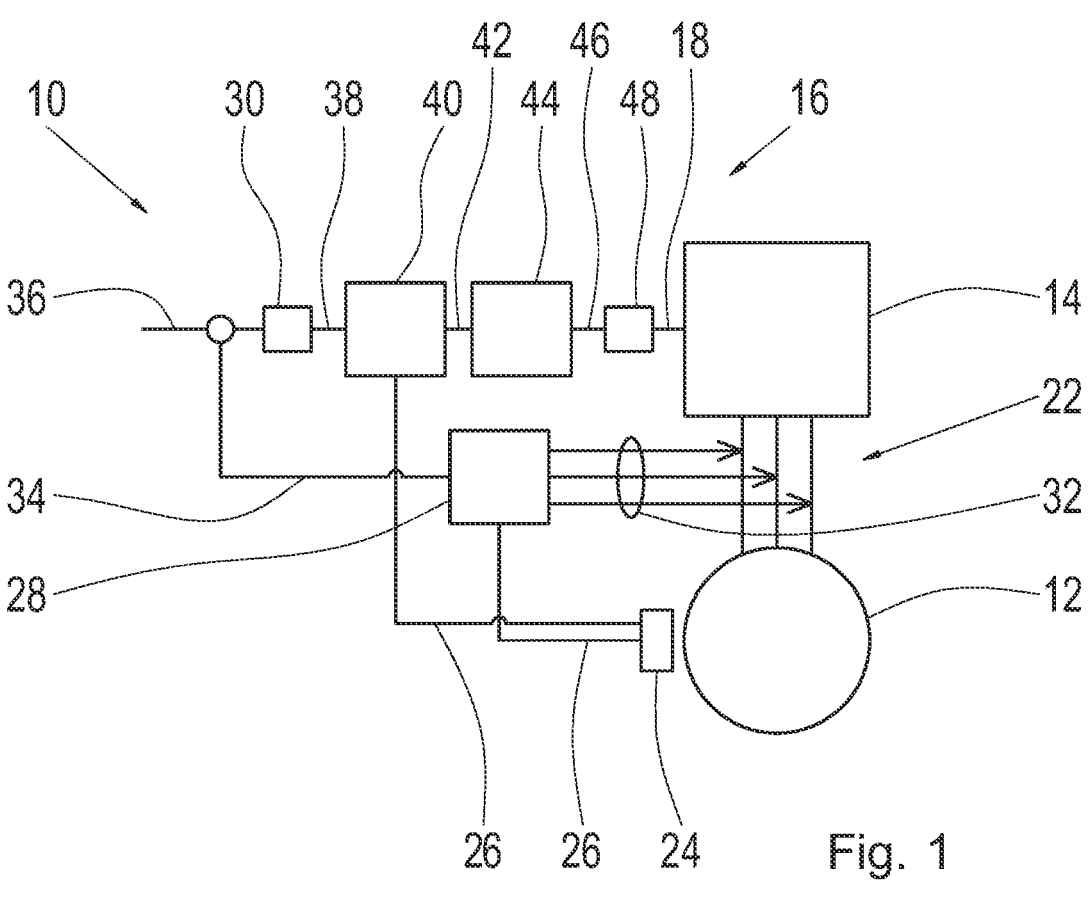
Fig. 1
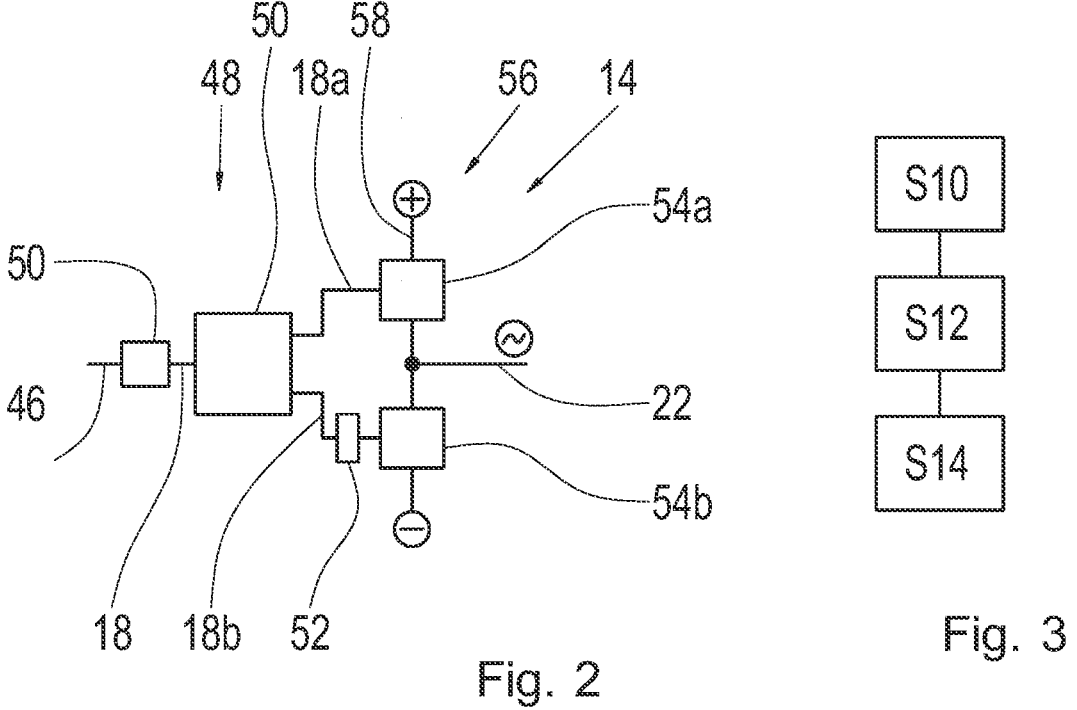
Fig. 2
Fig. 3

RANDOM SHIFTING OF SWITCHING EDGES OF A CONVERTER PULSE PATTERN

CROSS-REFERENCE TO RELATED APPLICATIONS

This application is a U.S. national stage application under 35 U.S.C. § 371 of PCT Application No. PCT/EP2020/084872, filed on Dec. 7, 2020, and published as WO 2021/139938 A1 on Jul. 15, 2021, which claims priority from German Application No. DE 10 2020 200 244.4, filed on Jan. 10, 2020, the entirety of which are each hereby fully incorporated by reference herein.

The invention relates to a method and a control system for controlling a converter. The invention also relates to a motor system.

The acoustic and electromagnetic properties of modern electrical powertrains have taken on an increasingly important role. As a result, stricter requirements for electromagnetic tolerances and acoustics must be satisfied with drives supplied with power by electrical converters. For this reason, certain measures have been proposed that would contribute to an improvement in the aforementioned properties.

By way of example, the electromagnetic design of the motor can be optimized such that the same torque can be generated with less electricity. By appropriately adjusting the modulation process, the typically maximum spectral levels obtained with multiples of the switching frequencies can be lowered. Disruptions associated with the conductors can be reduced with hardware filter components. A suitable housing material and design can suppress radio interference or reduce acoustic abnormalities. Actively modifying the harmonic content results in noise reduction.

A predefined modulation process is used for controlling a converter. The modulation process determines the pulse patterns obtained in the converter through the switching of the semiconductor. This switching generates spectral components that are independent of the defined switching frequency, which have negative acoustic and electromagnetic properties.

The object of the invention is to better satisfy acoustic and electromagnetic requirements for a motor system. A further object of the invention is the reduction of harmonics or their energy in a motor system.

These objects are achieved by the subject matter of the independent claims. Further embodiments of the invention can be derived from the dependent claims and the following description.

One aspect of the invention relates to a method for controlling a converter. A converter can be designed to convert an input voltage, e.g. from a DC circuit, to an output voltage, e.g. an AC voltage. By way of example, the voltage from a battery can be converted to an AC voltage for powering an electric motor. It is also possible to convert an AC voltage from a generator, which can function as the electric motor, to a DC voltage for charging a battery. The converter may have one or more half bridges, each of which contains numerous semiconductor switches, such as IGBTs. Each half bridge can convert a DC voltage to an AC voltage and vice versa. The method can be executed automatically by a control system for the converter, which switches the semiconductor switch on and off according to a pulse pattern.

According to one embodiment of the invention, the method comprises: determining a pulse pattern for the converter in which the pulse pattern contains switching transitions at which an output voltage is switched between two levels; shifting the switching transitions of the pulse pattern by adding a random value to a time when a switching transition occurs at which the output voltage is switched; and applying the pulse pattern with the shifted switching transitions to switching elements in the converter to generate the output voltage.

A pulse pattern, which can have a single phase or multiple phases, comprises numerous switching transitions, each of which indicate a time at which an output voltage is switched, e.g. from a first voltage level to a second voltage level, in the converter. The pulse pattern can be generated by means of a modulation process in which the switching transitions are determined on the basis of a reference value, i.e. a reference voltage, reference current, and/or reference torque. One such modulation is pulse-width modulation, by way of example. The converter can be a two-point converter with just two voltage levels, or a multi-level converter, which has more than two voltage levels.

The switching transitions of the pulse pattern, or a portion thereof, are shifted randomly after the pulse pattern has been generated. One option is to randomly shift all of the switching transitions. It is also possible to randomly shift only a portion of the switching transitions. This could mean that only half of the switching transitions are shifted.

These switching transitions can be shifted either forward or backward in time. The difference between the times for original switching transitions and the new switching transitions, i.e. the time difference, is selected randomly. By way of example, the random value can be generated using a randomizer. The random value can be positive or negative.

Switching signals for the semiconductor switches in the converter can be generated from the pulse pattern with the shifted switching transitions, which are then switched accordingly in order to obtain the output voltage. In certain cases, the switching signals can also be regarded as the pulse pattern, and/or the timing of the switching signals can be shifted randomly.

Pronounced spectral components of the output voltage can be reduced and/or distributed over the entire spectrum through an arbitrary, random shifting of the switching transitions.

On the whole, the acoustic and electromagnetic properties of electrical powertrains can be improved with the method by randomly shifting the switching transitions in the converters supplying power thereto. The method can be implemented easily, and requires very little CPU capacity when implanted in the form of a computer program. It can be used without significant financial and development costs. Any changes to a regulating system are minor, e.g. for generating the pulse pattern, if they are needed at all.

According to one embodiment of the invention, the random value lies within a predefined range. This random value, or shifting difference, can have an upper and/or lower limit. The reduction in harmonics is normally a function of the range, or interval, in which the switching transition can be shifted randomly. A larger range, i.e. a greater interval, can result in a greater reduction, but it may also have a negative impact on the regulation.

According to one embodiment of the invention, the negative and positive limits of the predefined range have the same numeric value. In other words, the negative limit value can be equal to the positive limit value. As a result, the switching transitions can be shifted equally in both directions.

Another possibility is that the switching transitions can only be shifted forward or backward. The lower or upper limit value can then be zero.

According to one embodiment of the invention, the random values are distributed evenly within the range. This means that with numerous random values, the probability of the random value being equal to any two arbitrary points is the same. Other random distributions such as a Gaussian distribution, or specific discrete values within the range, can also be used. The harmonics can also be distributed throughout the entire spectrum using the selected random distribution.

According to one embodiment of the invention, the switching transitions are shifted such that the boundary conditions of the pulse pattern are maintained. These boundary conditions can comprise a sequence of switching transitions in a phase, a sequence of switching transitions over numerous phases, minimum and maximum spacings between the switching transitions, etc.

If a shifted switching transition falls outside a range such that it no longer satisfies a boundary condition, the shifting can be rolled back, or the switching transition can be placed at that point in time where it only just satisfies the boundary condition.

According to one embodiment of the invention, the converter contains a half bridge with an upper switch and a lower switch, for each of which a pulse pattern is generated. Each of the switches can be an IGBT with antiparallel diodes. The two pulse patterns can determine when the upper switch is switched on and the lower switch is switched off, and vice versa. The two pulse patterns can be mirror images of one another. As a result, two opposing switching transitions are generated for the switches from a switching transition for the converter phase.

According to one embodiment of the invention, a switching transition for the pulse pattern of the switch is shifted in relation to an associated switching transition of the pulse pattern for the upper switch by means of a dead time offset, in which the random value can be added to the dead time offset. With a dead time offset of approx. 1-2 μs, the two switches are never off at the same time, which would normally lead to a short circuit. The shifting of the switching transitions can therefore be carried out for the pulse patterns of both switches, in particular by altering the dead time offset. It should be understood that the range for the random value should be selected such that the dead time offset does not fall below a minimum value.

According to one embodiment of the invention, the pulse pattern is generated using pulse-width modulation, e.g. space vector modulation (SV PWM).

According to one embodiment of the invention, the output voltage of the converter comprises multiple phases, for each of which a phase pulse pattern is generated. The switching transitions in the various phases of the phase pulse patterns can be shifted independently of one another using random values.

Another aspect of the invention relates to a control system for a converter that is designed to execute the method as it is described herein. The control system can comprise a regulator for generating the pulse pattern, and a shifting component for shifting the switching transitions. All of these components can also be implemented as software modules in software executed in the control system.

Another aspect of the invention relates to a motor system that comprises a converter, a control system of the type described above, and an electric motor, which is operated with an output voltage generated by the converter. The motor system can be the powertrain, or at least part of the powertrain, for a road vehicle.

It should be understood that features of the method as they are described above and below can also be features of the motor system, and vice versa.

Further aspects of the invention relate to a computer program, which executes the method described above and below when run on a processor, and a machine-readable medium on which such a computer program is stored. A machine-readable medium can be a hard disk, a USB storage device, a RAM, ROM, EPROM, or flash drive. A machine-readable medium can also be a data communications network, e.g. the internet, from which program code can be downloaded. The machine-readable medium can be a volatile or non-volatile medium. Features of the method, as described above and below, can also be features of the computer program and/or the machine-readable medium.

Exemplary embodiments of the invention shall be described in detail below in reference to the drawings. Therein:

FIG. 1 shows a motor system according to an embodiment of the invention;

FIG. 2 shows a part of the motor system according to an embodiment of the invention;

FIG. 3 shows a flow chart that illustrates a method for controlling a computer according to an embodiment of the invention;

The reference symbols used in the drawings and the objects to which they refer are listed in the reference symbol index at the end of this section. Identical or similar parts have the same reference symbols in each figure.

Figures 4, 5A, 5B, 6:
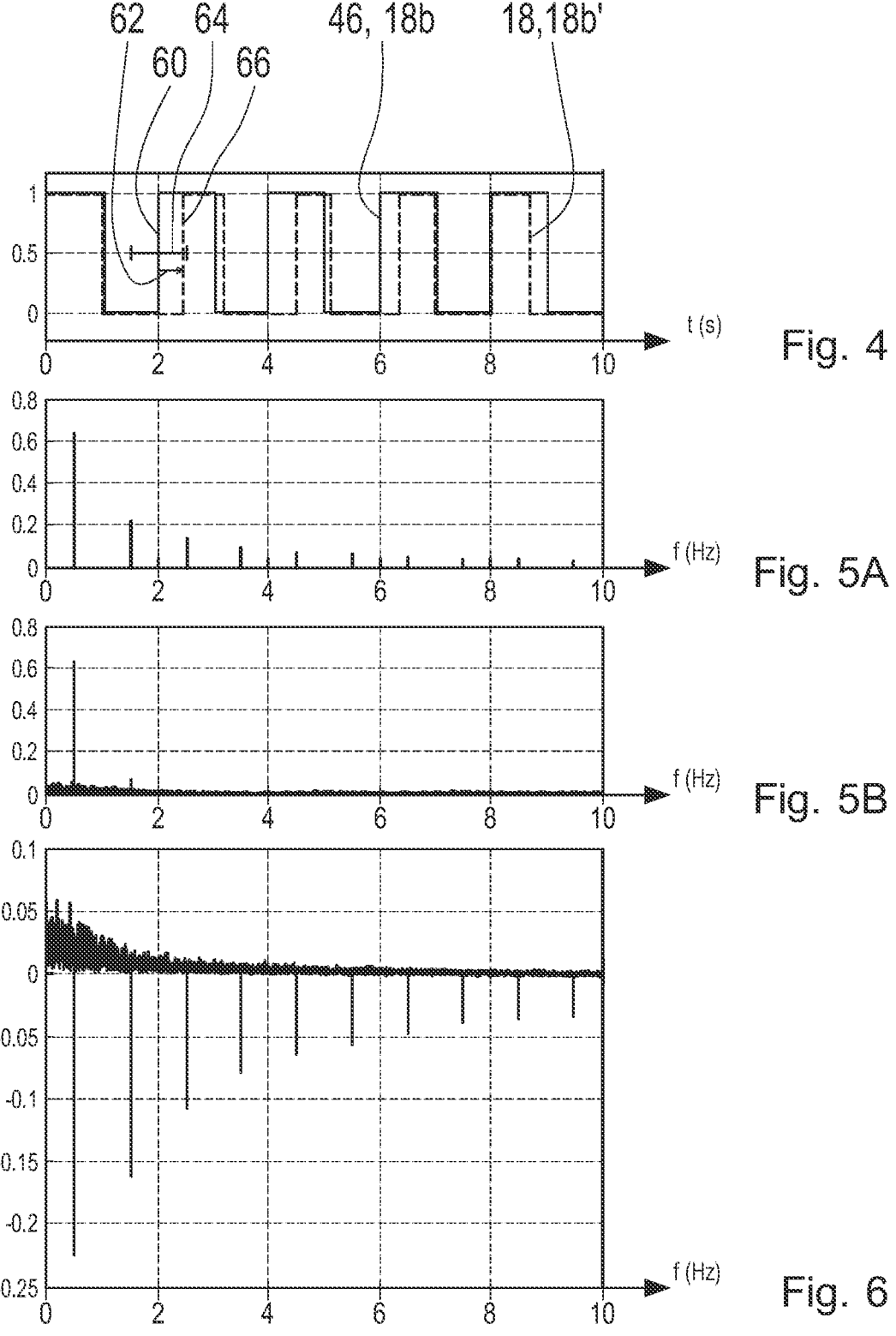
FIG. 4 shows a diagram of pulse patterns.
FIGS. 5A and 5B show diagrams with spectra of voltages that are generated with pulse patterns.
FIG. 6 shows a diagram with the differences in the spectra shown in FIGS. 5A and 5B.

FIG. 1 shows a motor system 10 that comprises an electric motor 12, a converter 14 and a control system 16. The control system 16 generates a pulse pattern 18 with which the converter 14 is controlled. The converter 14 generates a three-phase output voltage 22 on the basis thereof, with which the motor 12 is powered. The motor system 10 can be part of a powertrain for a road vehicle, e.g. a passenger automobile, truck, bus, or motorcycle. The control system 16 can contain a processor that executes the software modules described below.

A position or angle sensor 24 generates a position signal 26 for the motor rotor, which is sent to a DQZ transformer 28 and an αβγ transformer 30 in the control system 16. The DQZ transformer 28 receives a current signal 32 for the motor current and transforms it into a current signal in the DQZ system. The current signal 34 is subtracted from a reference current signal 36, and the difference is sent to the αβγ transformer 30, which generates a difference signal 38 in the αβγ system, which is then sent to a regulator 40. The regulator 40 generates a target voltage signal 42, from which a modulator 44 generates a pulse pattern 46. A shifting module 48 transforms the pulse pattern into a pulse pattern 18 that has randomly shifted switching transitions.

FIG. 2 shows a part of the motor system 10 in greater detail. The shifting module 48 can contain a transition shifter 50, which randomly shifts switching transitions in the pulse pattern 46 for a phase of the converter 14, thus generating a shifted pulse pattern 18. The shifted pulse pattern 18 could also be generated using a dead time generator 52. Both alternatives shall be explained in greater detail below.

The shifting modules 48 can also contain a switch pulse pattern generator 51, which generates two switch pulse patterns 18a, 18b from the pulse pattern 18, or directly from the unshifted pulse pattern 46 for a phase of the converter 14, which are then sent to an upper switch 54a and lower switch 54b in a half bridge 56 in the converter 14. The dead time generator 52 then shifts the times of the switching transitions in the pulse pattern 18b for the lower switch 54b, in order to generate an earlier dead time for the shifted switch pulse pattern 18b'. The dead time is intended to prevent both switches 54a, 54b from being off at the same time, resulting in a short circuiting of the half bridge 56. The dead time is therefore based on a random value with which the switching transitions of the switch pulse pattern 18b are randomly shifted. It should be understood that the switch pulse pattern 18b' can also be regarded as a pulse pattern for the converter 14 with shifted switching transitions.

The half bridge 56 with the two switches 54a, 54b, which are connected in series, can be connected to an intermediate circuit, and generates a phase of the output voltage 22 from the DC voltage 58 there. The output voltage 22 then has substantially the same shape as the pulse pattern 18.

FIG. 3 shows a flow chart for a method for controlling the converter 14. As noted above, the output voltage 22 of converter 14 can comprise multiple phases. The method shall be described below for one of these phases, where it is to be understood that it can be carried out separately for each of these phases.

The modulator 44 determines the pulse pattern 46 for the converter 14 in step S10 on the basis of the reference voltage generated by the regulator 40. The pulse pattern 46 can be generated using pulse-width modulation, for example.

FIG. 4 shows such a pulse pattern 46 in greater detail. The pulse pattern 46 contains switching transitions 60, indicating where an output voltage 22 is to be switched back and forth between the two levels 0 and 1. For purposes of clarity, only one of the switching transitions is indicated with the reference symbol.

The switching transitions 60 in the pulse pattern 46 are shifted to a new point in time in step S12 by the transition shifter. The pulse pattern 18 with the shifted switching transitions 66 is also shown in FIG. 4. The switching transitions 60 are shifted in that a random value 62 is added to the points in time of the original switching transitions 60 at which the output voltage 22 is to be switched.

The random value 62 lies within a predefined range 64, which limits the shifting to a defined time period. The predefined range 64 can extend equally in both the positive and negative directions, i.e. the random values can be shifted to the same extent into the past as into the future.

The random values generated in the range 64 can also be distributed evenly. A random number generator that generates the random values 62 can be set such that each value within the range 64 is selected with the same probability.

It can also be ensured that the switching transitions 60 are shifted such that the boundary conditions for the pulse pattern 46 are maintained. By way of example, the switching transitions 60 can only be shifted into the future to the extent that a predefined spacing to the next switching transition is maintained.

Alternatively or additionally, it can also be the case that the shifting of a switching transition takes place using a dead time offset for a switch 54a, 54b in the converter 14 obtained with the dead time generator. In this case, line 46 in FIG. 4 corresponds to the switch pulse pattern 18b, which has already been shifted by a predefined, constant dead time, and line 18 corresponds to the switch pulse pattern 18b'. The random value 62, which can lie in a range of −1 μs to +1 μs, for example, is also added to the dead time, which can be approx. 2 μs. This ensures a minimum dead time of 1 μs.

The pulse pattern 18 (or the switch pulse patterns 18a, 18b') with the shifted switching transitions 66 is then applied to the switch elements 54a, 54b in the converter 14 in order to generate the output voltage 22.

FIG. 5A shows the spectrum of an output voltage 22 that has been generated using a pulse pattern 45 in which the switching transitions 60 have not been shifted randomly. The harmonics generated by the uniform, rectangular pulse pattern 46 with multiples of the period frequency can be readily seen as peaks in the spectrum.

Analogously, FIG. 5B shows the spectrum of an output voltage 22 that has been generated using a pulse pattern 18 in which the switching transitions 60 have been shifted randomly. It can be seen that the energies of the peaks are lower, and that the energies of other portions of the frequency are higher.

FIG. 6 shows a diagram in which the spectrum in FIG. 5B has been subtracted from the spectrum in FIG. 5A. It can be clearly seen here that the energies of the spectral portions of the harmonics have decreased. As a result of the reduced energies of the harmonics, there is a lower chance of harmful resonances occurring in the motor system 10. This increases the electromagnetic tolerance in the motor system 10. Acoustic problems are also reduced.

It should also be noted that the term, "comprises" does not exclude other elements or steps, and the terms "one," or "a" do not exclude a plurality. It should also be noted that features or steps that are described in reference to one of the above exemplary embodiments can also be used in combination with other features or steps from other exemplary embodiments described above. Reference symbols in the claims are not be regarded as limiting.

REFERENCE SYMBOLS

10 motor system
12 electric motor
14 converter
16 control system
18 pulse pattern
18a switch pulse pattern
18b switch pulse pattern
18b' shifted switch pulse pattern
22 output voltage
24 position and/or angle sensor
26 position signal
28 DQZ transformer
30 αβγ transformer
32 current signal
34 transformed current signal
36 reference current signal
38 difference signal
40 regulator
42 target voltage signal
44 modulator
46 original pulse pattern
48 shifting module
50 transition shifter
51 switch pulse pattern generator
52 dead time generator
54a upper switch
54b lower switch
56 half bridge
58 DC voltage
60 switching transition
62 random value
64 range
66 shifted switching transition

The invention claimed is:

1. A method for controlling a converter, comprising:

determining a pulse pattern for the converter, wherein the pulse pattern contains switching transitions at which an output voltage is switched between two levels, and wherein the converter comprises at least one half bridge comprising an upper switch and a lower switch, or a multi-level converter;

shifting switching transitions in the pulse pattern, wherein a random value is added to a point in time at which the output voltage is switched to shift the switching transitions;

generating a first pulse pattern for the upper switch and a second pulse pattern for the lower switch based on the pulse pattern with the shifted switching transitions, wherein a switching transition of the second pulse pattern for the lower switch is shifted in relation to an associated switching transition of the first pulse pattern for the upper switch by a dead time offset;

determining that a shifted switching transition in the pulse pattern formed by adding the random value to the point in time at which the output voltage is switched does not satisfy boundary conditions for the pulse pattern;

rolling back the shifted switching transition to a new shifted switching transition time where the boundary conditions for the pulse pattern are met; and applying the first pulse pattern to the upper switch and applying the second pulse pattern to the lower switch to generate the output voltage.

2. The method according to claim 1, wherein the random value lies within a predefined range.

3. The method according to claim 2, wherein the predefined range extends equally in the negative and positive directions.

4. The method according to claim 2, wherein the random value generated in the predefined range is distributed equally.

5. The method according to claim 1, comprising:

adding the random value to the dead time offset.

6. The method according to claim 5, comprising:

adding the random value to the dead time within a set range to ensure a minimum dead time offset is maintained between a switching transition of the upper switch and a corresponding switching transition of the lower switch.

7. The method according to claim 1, wherein the pulse pattern is generated using a modulation process.

8. The method according to claim 1, wherein the output voltage of the converter comprises a plurality of phases, for each of which a pulse pattern is generated;

wherein the switching transitions in the plurality of phases are shifted independently of one another.

9. A control system for the converter, which is configured to execute the method according to claim 1.

10. A motor system, comprising:

the converter, the control system according to claim 9, and an electric motor, which is operated with the output voltage generated by the converter.

11. The method according to claim 1, wherein the dead time offset is configured to prevent short circuit of the at least one half bridge due to the upper switch and the lower switch being activated at a same time.

* * * * *